US012780199B2

(12) United States Patent
Oe et al.

(10) Patent No.: US 12,780,199 B2

(45) Date of Patent: Nov. 3, 2026

(54) SAFE-DRIVING ASSIST SYSTEM

(71) Applicants: TOYOTA JIDOSHA KABUSHIKI KAISHA, Toyota (JP); Nomura Research Institute, Ltd., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 185 days.

(21) Appl. No.: 18/677,113

(22) Filed: May 29, 2024

(65) Prior Publication Data

US 2025/0010859 A1 Jan. 9, 2025

(30) Foreign Application Priority Data

Jul. 6, 2023 (JP) ................................ 2023-111636

(51) Int. Cl.

| | |
|---|---|
| ***B60T 7/12*** | (2006.01) |
| ***B60Q 9/00*** | (2006.01) |
| ***B60W 10/20*** | (2006.01) |
| ***B60W 30/16*** | (2020.01) |
| ***B60W 50/14*** | (2020.01) |

(52) U.S. Cl.

CPC ........... *B60W 30/162* (2013.01); *B60Q 9/008* (2013.01); *B60W 10/20* (2013.01); *B60W 50/14* (2013.01); *B60W 2050/143* (2013.01); *B60W 2520/10* (2013.01); *B60W 2554/802* (2020.02)

(58) Field of Classification Search

CPC ... B60Q 9/0008; B60W 30/162; B60W 10/04; B60W 10/20; B60W 30/16; B60W 50/14; B60W 2050/143; B60W 2520/10; B60W 2554/4046; B60W 2554/802; B60W 2754/20; B08G 1/166; B07C 5/14; G07C 5/0866; G08G 1/0965; G08G 1/096725; G08G 1/09679; G08G 1/161

See application file for complete search history.

(56) References Cited

U.S. PATENT DOCUMENTS

2015/0206434 A1* 7/2015 Shimotani .............. G08G 1/163 701/1

2017/0137033 A1* 5/2017 Habu .................... B60W 10/20

FOREIGN PATENT DOCUMENTS

JP 2007-072641 A 3/2007

* cited by examiner

*Primary Examiner* — Adam M Alharbi

(74) *Attorney, Agent, or Firm* — Sughrue Mion, PLLC

(57) ABSTRACT

A safe-driving assist system is equipped in a vehicle including a drive recorder. The safe-driving assist system includes a control device and an informing device. The control device executes acquiring an image captured by the drive recorder, detecting a peripheral vehicle shown in the acquired image, determining whether a driver sign is displayed on the detected peripheral vehicle, and outputting a warning signal when the peripheral vehicle on which the driver sign is displayed has been detected. The informing device informs a driver about existence of the peripheral vehicle on which the driver sign is displayed, when the warning signal output by the control device has been received.

6 Claims, 3 Drawing Sheets

SAFE-DRIVING ASSIST SYSTEM

CROSS-REFERENCE TO RELATED APPLICATION

This application claims priority to Japanese Patent Application No. 2023-111636 filed on Jul. 6, 2023, incorporated herein by reference in its entirety.

BACKGROUND

1. Technical Field

The disclosure relates to a safe-driving assist system.

2. Description of Related Art

Japanese Unexamined Patent Application Publication No. 2007-072641 discloses a dangerous-vehicle detection device that determines whether a different vehicle near a vehicle that is being driven by a driver is performing dangerous traveling, based on the behavior of the different vehicle. When the different vehicle that is performing dangerous traveling has been detected, the dangerous-vehicle detection device notifies the driver about the existence of the different vehicle that is performing dangerous traveling.

By such a notification, the driver can perform a defensive driving for preventing a traffic accident, such as securing the distance from the different vehicle.

SUMMARY

Against a vehicle that is driven by a beginner, an elderly person, or the like, it is desirable to perform driving at ease, for example, to drive with a sufficient inter-vehicle distance.

Means for solving the above problem and the function effect of the means will be described below.

A safe-driving assist system for solving the above problem is equipped in a vehicle including a drive recorder. The safe-driving assist system includes a control device that executes acquiring an image captured by the drive recorder, detecting a peripheral vehicle shown in the acquired image, determining whether a driver sign is displayed on the detected peripheral vehicle, and outputting a warning signal when the peripheral vehicle on which the driver sign is displayed has been detected. The safe-driving assist system includes an informing device that informs a driver about existence of the peripheral vehicle on which the driver sign is displayed, when the warning signal output by the control device has been received.

The driver of the vehicle equipped with the above safe-driving assist system easily becomes aware of the peripheral vehicle on which the driver sign is displayed. Accordingly, the driver of the vehicle equipped with the above safe-driving assist system is likely to perform driving at ease, against the peripheral vehicle on which the driver sign is displayed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of a safe-driving assist system will be described below with reference to FIG. 1 to FIG. 6.

Configuration of Safe-Driving Assist System

The safe-driving assist system is equipped in a vehicle 100, and performs, to the vehicle 100, a driving assist for coping with objects such as peripheral vehicles and obstacles in the traveling environment of the vehicle 100.

Figure 1:
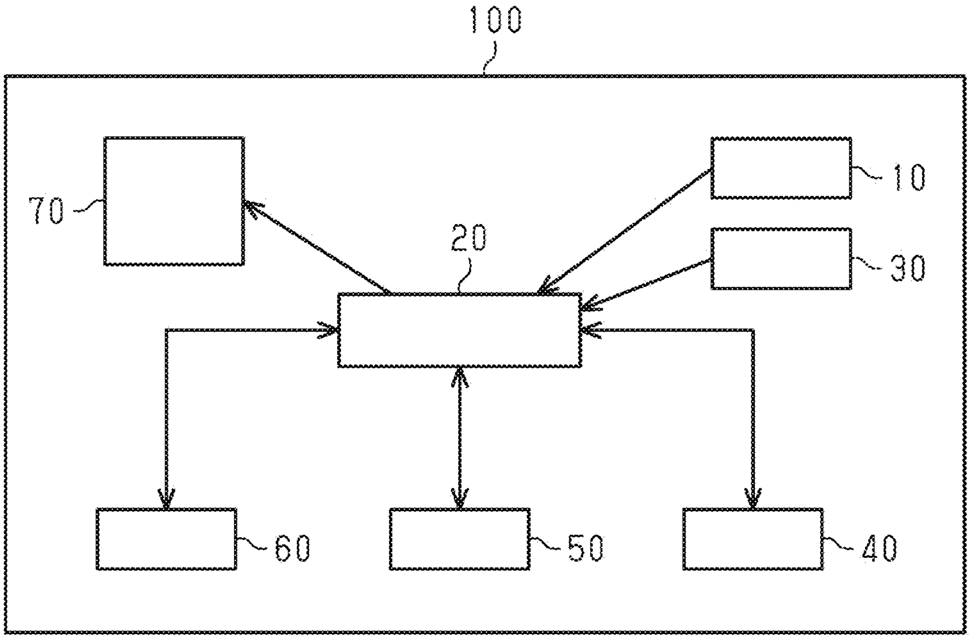
FIG. 1 is a block diagram showing the whole configuration of a vehicle that is equipped with a safe-driving assist system in an embodiment.

As shown in FIG. 1, the vehicle 100 includes a drive recorder 10, a control device 20, a sensor group 30, a power train 40, a power steering system 50, a brake system 60, and an informing device 70. The drive recorder 10, the control device 20, the sensor group 30, the power train 40, the power steering system 50, the brake system 60, and the informing device 70 constitute the safe-driving assist system.

The control device 20 can perform an overall control to the vehicle 100, and can manage the motion of the vehicle 100. The control device 20 can adjust the traveling speed of the vehicle 100, by controlling the power train 40 and the brake system 60. The control device 20 can adjust the turning angle of tires and adjust the movement direction of the vehicle 100, by controlling the power steering system 50.

The sensor group 30 can acquire the relative distance between the vehicle 100 and a periphery vehicle, an obstacle, or the like that is positioned in the periphery of the vehicle 100. The sensor group 30 sends the acquired relative distance to the control device 20. For example, the sensor group 30 can be constituted by various sensors such as a camera, a millimeter-wave radar, a light detection and ranging (LiDAR), and an ultrasonic sensor (sonar). Further, the sensor group 30 may include other sensors such as an accelerator sensor, a brake sensor, a gyroscope sensor, and an acceleration sensor.

The informing device 70 is connected to the control device 20 so as to be capable of receiving a warning signal from the control device 20. When the warning signal from the control device 20 has been received, the informing device 70 informs a driver of the vehicle 100 about the existence of a peripheral vehicle on which a driver sign is displayed. The specific technique is not particularly limited, as long as the informing device 70 can give warning so as to call the attention of the driver of the vehicle 100.

For example, a speaker that outputs warning sound, a display device of a navigation system that is equipped in the vehicle 100, a display device of the drive recorder 10, a steering wheel that has a warning function, a dashboard, or the like can be used as the informing device 70. The display device gives warning by performing displaying for calling attention. The steering wheel that has a warning function gives warning by vibrating. The dashboard gives warning by lighting a warning lamp or by performing displaying for calling attention on an information display.

Figure 2:
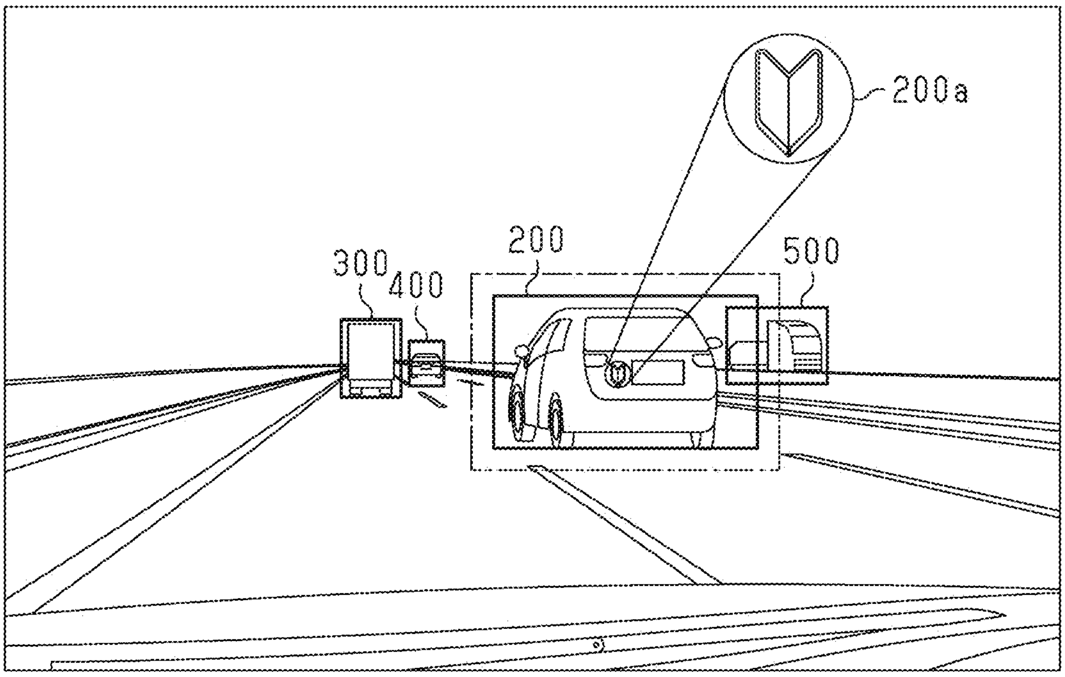
FIG. 2 is a diagram showing an exemplary image that is captured by a drive recorder of the safe-driving assist system.

FIG. 2 shows an exemplary image that is captured by the drive recorder 10. As shown in FIG. 2, the drive recorder 10 captures and records an image of the forward view of the vehicle that is seen from a driver's seat.

In the example shown in FIG. 2, a driver sign 200*a* is displayed on one of peripheral vehicles that travel forward of the vehicle 100. Examples of the driver sign 200*a* include a beginner driver sign that is displayed by a driving beginner and an elderly driver sign that is displayed by an elderly person. In the example shown in FIG. 2, the beginner driver sign is displayed.

For safe driving, against a vehicle that is driven by the beginner, the elderly person, or the like, it is desirable to perform driving at ease, for example, to drive with a sufficient inter-vehicle distance. Hence, the safe-driving assist system detects the peripheral vehicle on which the driver sign 200*a* is displayed, from the image captured by the drive recorder 10. Then, when the safe-driving assist system has detected the peripheral vehicle on which the driver sign 200*a* is displayed, the safe-driving assist system informs the driver about the existence of the peripheral vehicle on which the driver sign 200*a* is displayed.

A flow of a process that is executed in the safe-driving assist system will be specifically described below with reference to FIG. 3 to FIG. 6.

Figure 3:
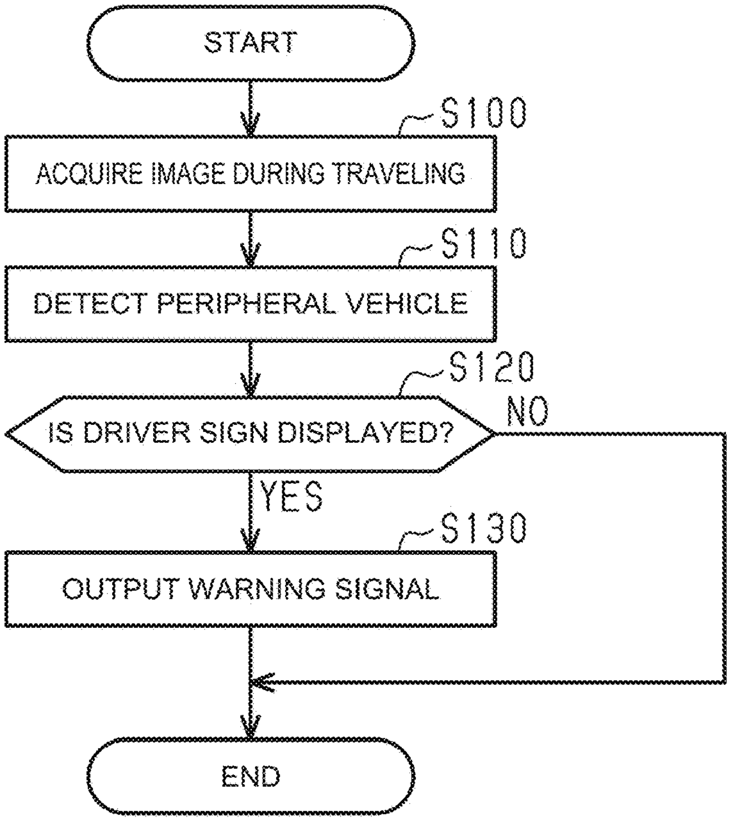
FIG. 3 is a flowchart for informing a driver about a peripheral vehicle on which a driver sign is displayed, in the safe-driving assist system.

FIG. 3 is a flowchart for informing the driver of the vehicle 100 about the peripheral vehicle on which the driver sign 200*a* is displayed, in the safe-driving assist system. This sequential process is executed by the control device 20 during the traveling of the vehicle 100. As shown in FIG. 3, when the sequential process is started, the control device 20, first, acquires the image captured by the drive recorder 10, in the process of step S100. Specifically, the image of the forward view of the vehicle 100 that is captured by a forward camera of the drive recorder 10 during traveling is acquired.

Next, in the process of step S110, the control device 20 detects the peripheral vehicle from the image acquired in the process of step S100. Specifically, the control device 20 detects the peripheral vehicle shown in the acquired image, by performing an image recognition process with use of a model for which a supervised learning for detecting a vehicle shown in an image has been performed. In the example shown in FIG. 2, four detected peripheral vehicles 200, 300, 400, 500 are shown while being enclosed by solid lines.

Next, in step S120, the control device 20 determines whether the driver sign 200*a* is displayed, for each of the peripheral vehicles detected from the image captured by the drive recorder 10. Specifically, the control device 20 determines whether the driver sign 200*a* is displayed on the detected peripheral vehicle, by performing an image recognition process with use of a model for which a supervised learning for detecting the driver sign 200*a* shown in an image has been performed. In the example shown in FIG. 2, the driver 10 sign 200*a* is displayed on the peripheral vehicle 200, among the four detected peripheral vehicles 200, 300, 400, 500.

When it is determined that the driver sign 200*a* is displayed on the peripheral vehicle in the process of step S120 (step S120: YES), the control device 20 transfers the process to step S130.

In the process of step S130, the control device 20 outputs, to the informing device 70, a warning signal for calling the attention of the driver of the vehicle 100 about the existence of the peripheral vehicle on which the driver sign 200*a* is displayed. Then, the control device 20 ends the sequential process.

The informing device 70 receives the warning signal, and informs the driver about the existence of the peripheral vehicle on which the driver sign 200*a* is displayed.

On the other hand, when it is determined that there is no peripheral vehicle on which the driver sign 200*a* is displayed in the process of step S120 (step S120: NO), the control device 20 does not execute the process of step S130, and ends the sequential process with no change. 25

Switching of Safe-Driving Assist Mode

The safe-driving assist system switches a safe-driving assist mode depending on whether the peripheral vehicle on which the driver sign 200*a* is displayed has been detected. The safe-driving assist system has a general driving assist and a specified driving assist, as the safe-driving assist mode. The driving assist includes a speed control to control the power train 40 and the brake system 60 such that an inter-vehicle distance to an ahead-traveling vehicle is secured, and a steering assist to operate the power steering system 50 such that a lateral distance to the peripheral vehicle is secured. The difference between the general driving assist and the specified driving assist will be described later.

Figure 4:
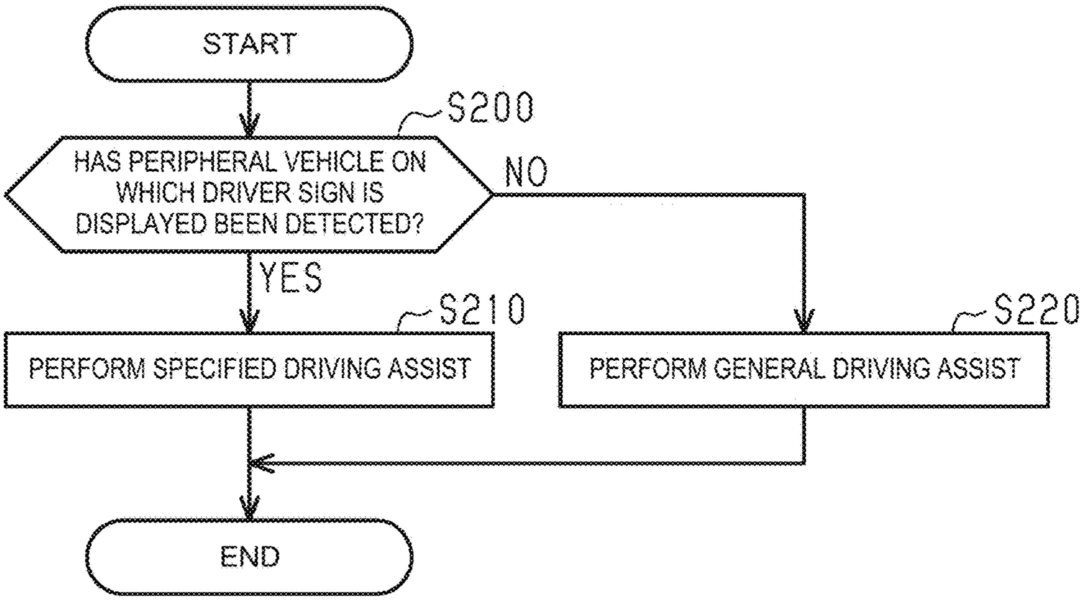
FIG. 4 is a flowchart for switching a safe-driving assist mode in the safe-driving assist system.

FIG. 4 is a flowchart for switching the safe-driving assist mode in the safe-driving assist system. This sequential process is executed by the control device 20 during the traveling of the vehicle 100.

As shown in FIG. 4, when the sequential process is started, the control device 20 determines whether the peripheral vehicle on which the driver sign 200*a* is displayed has been detected, in step S200.

When it is determined that the peripheral vehicle on which the driver sign 200*a* is displayed has been detected in the process of step S200 (step S200: YES), the control device 20 transfers the process to step S210. In step S210, the control device 20 performs the specified driving assist against the peripheral vehicle on which the driver sign 200*a* is displayed.

When it is determined that the driver sign 200*a* is not displayed in the process of step S200 (step S200: NO), the control device 20 transfers the process to step S220. In step S220, the control device 20 performs the general driving assist against the peripheral vehicle on which the driver sign 200*a* is not displayed.

The control device 20 performs the specified driving assist or the general driving assist in this way, and then ends the sequential process.

Figure 5:
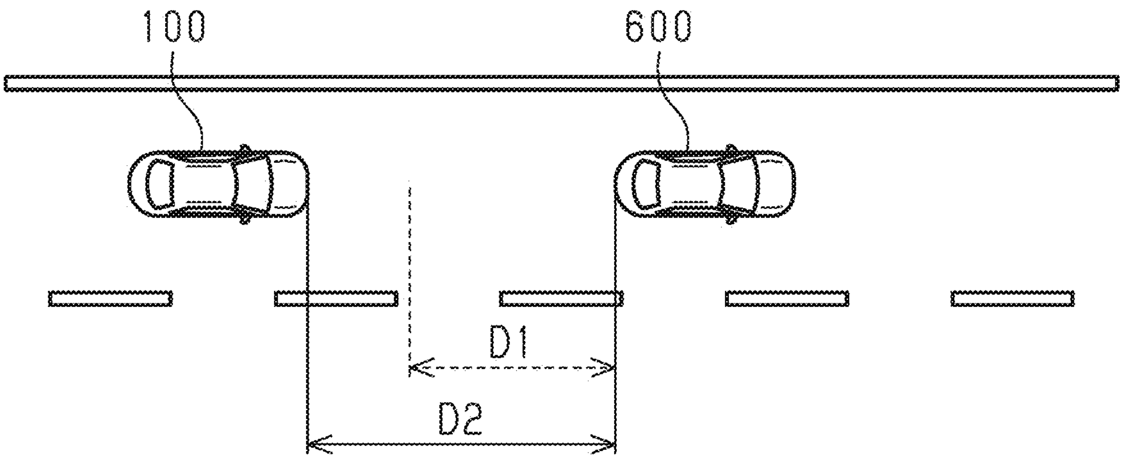
FIG. 5 is a diagram showing a comparison between an inter-vehicle distance to a peripheral vehicle on which the driver sign is displayed and an inter-vehicle distance to a peripheral vehicle on which the driver sign is not displayed, in the safe-driving assist system.

Next, the difference between the general driving assist and the specified driving assist will be described with reference to FIG. 5 and FIG. 6. FIG. 5 shows the difference between a general speed control that is a speed control in the general driving assist and a specified speed control that is a speed control in the specified driving assist.

An ahead-traveling vehicle 600 shown in FIG. 5 is a vehicle that travels forward of the vehicle 100. When the driver sign 200*a* is not displayed on the ahead-traveling vehicle 600 that is the peripheral vehicle, the control device 20 performs the general driving assist as described above. In the general speed control that is the speed control in the general driving assist, the control device 20 controls the power train 40 and the brake system 60 such that the inter-vehicle distance to the ahead-traveling vehicle 600 is equal to or longer than a first inter-vehicle distance D1.

On the other hand, when the driver sign 200*a* is displayed on the ahead-traveling vehicle 600 that is the peripheral vehicle, the control device 20 performs the specified driving assist as described above. In the specified speed control that is the speed control in the specified driving assist, the control device 20 controls the power train 40 and the brake system 60 such that the inter-vehicle distance to the ahead-traveling vehicle 600 is equal to or longer than a second inter-vehicle distance D2. As shown in FIG. 5, the second inter-vehicle distance D2 is longer than the first inter-vehicle distance D1. The first inter-vehicle distance D1 only needs to be appropriately set such that the collision with the ahead-traveling vehicle 600 is unerringly prevented, in consideration of the speed of the vehicle 100 and the braking distance of the vehicle 100.

Figure 6:
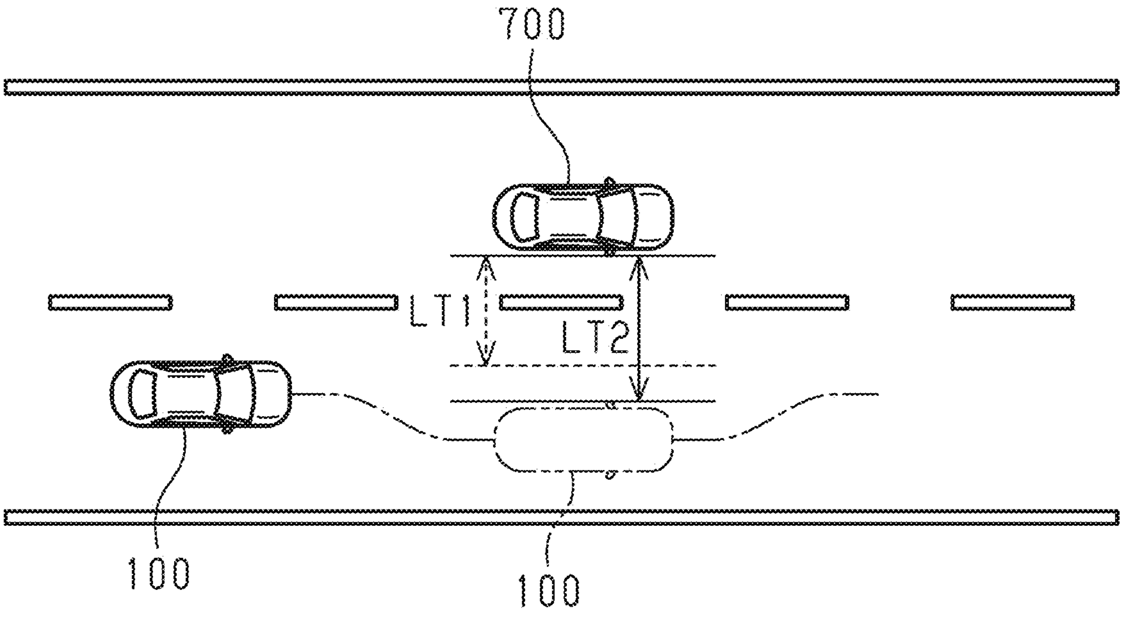
FIG. 6 is a diagram showing a comparison between a lateral distance to a peripheral vehicle on which the driver sign is displayed and a lateral distance to a peripheral vehicle on which the driver sign is not displayed, in the safe-driving assist system.

FIG. 6 shows the difference between a general steering assist that is a steering assist in the general driving assist and a specified steering assist that is a steering assist in the specified driving assist.

A peripheral vehicle 700 shown in FIG. 6 is a peripheral vehicle that travels on a lane adjacent to a lane on which the vehicle 100 travels. When the driver sign 200*a* is not displayed on the peripheral vehicle 700, the control device 20 performs the general driving assist as described above. In the general steering assist that is the steering assist in the general driving assist, the control device 20 operates the power steering system 50 such that the lateral distance to the peripheral vehicle 700 is equal to or longer than a first lateral distance LT1. On the other hand, when the driver sign 200*a* is displayed on the peripheral vehicle 700, the control device 20 of the safe-driving assist system performs the specified driving assist as described above. In the specified steering assist that is the steering assist in the specified driving assist, the control device 20 operates the power steering system 50 such that the lateral distance to the peripheral vehicle 700 is equal to or longer than a second lateral distance LT2. As shown in FIG. 6, the second lateral distance LT2 is longer than the first lateral distance LT1. The first lateral distance LT1 only needs to be appropriately set based on the road condition, the traveling environment and speed of the vehicle 100, and the like.

Operation of Embodiment

As described with reference to FIG. 3, the control device 20 of the safe-driving assist system detects the peripheral vehicle from the image captured by the drive recorder 10. Then, the control device 20 determines whether the driver sign 200*a* is displayed on the detected peripheral vehicle. When the control device 20 has detected the peripheral vehicle on which the driver sign 200*a* is displayed, the informing device 70 informs the driver of the vehicle 100 about the existence of the peripheral vehicle on which the driver sign 200*a* is displayed.

In this way, the above safe-driving assist system recognizes the peripheral vehicle on which the driver sign 200*a* is displayed, and calls the attention of the driver.

Effect of Embodiment (1) The driver of the vehicle 100 equipped with the above safe-driving assist system easily becomes aware of the peripheral vehicle on which the driver sign 200*a* is displayed. Accordingly, the driver of the vehicle 100 equipped with the above safe-driving assist system is likely to perform driving at ease, against the peripheral vehicle on which the driver sign 200*a* is displayed.

(2) The above safe-driving assist system is equipped in the vehicle 100 including the sensor group 30 that measures the distance to the peripheral vehicle. When the control device 20 has detected, as the ahead-traveling vehicle, the peripheral vehicle on which the driver sign 200*a* is displayed, the control device 20 executes the speed control to operate the power train 40 and the brake system 60 such that the inter-vehicle distance to the ahead-traveling vehicle is secured.

In the above safe-driving assist system, when the control device 20 has detected, as the ahead-traveling vehicle, the peripheral vehicle on which the driver sign 200*a* is displayed, it is possible to easily know the inter-vehicle distance to the ahead-traveling vehicle, based on the measurement result of the distance by the sensor group 30. Therefore, the control device 20 can unerringly secure the inter-vehicle distance to the ahead-traveling vehicle, by executing the speed control to operate the power train 40 and the brake system 60. Accordingly, the above safe-driving assist system can perform the driving assist such that the inter-vehicle distance is unerringly secured against the peripheral vehicle on which the driver sign 200*a* is displayed.

(3) When the control device 20 has detected, as the ahead-traveling vehicle, the peripheral vehicle on which the driver sign 200*a* is not displayed, the control device 20 executes the general speed control. The general speed control is the speed control to operate the power train 40 and the brake system 60 such that the inter-vehicle distance to the ahead-traveling vehicle is equal to or longer than the first inter-vehicle distance D1. On the other hand, when the control device 20 has detected, as the ahead-traveling vehicle, the peripheral vehicle on which the driver sign 200*a* is displayed, the control device 20 executes the specified speed control. The specified speed control is the speed control to operate the power train 40 and the brake system 60 such that the inter-vehicle distance to the ahead-traveling vehicle is equal to or longer than the second inter-vehicle distance D2 that is longer than the first inter-vehicle distance D1.

In the above safe-driving assist system, against the ahead-traveling vehicle on which the driver sign 200*a* is not displayed, the control device 20 executes the general speed control to secure the inter-vehicle distance that is equal to or longer than the first inter-vehicle distance D1. On the other hand, against the ahead-traveling vehicle on which the driver sign 200*a* is displayed, the control device 20 executes the specified speed control to secure the inter-vehicle distance that is equal to or longer than the second inter-vehicle distance D2 longer than the first inter-vehicle distance D1. Therefore, the control device 20 can selectively execute the general speed control or the specified speed control, depending on whether the driver sign 200*a* is displayed. In this way, it is possible to unerringly secure the inter-vehicle distance against the peripheral vehicle, by the speed control to operate the power train 40 and the brake system 60, and in addition, to perform driving at case, particularly against the ahead-traveling vehicle on which the driver sign 200*a* is displayed.

(4) The above safe-driving assist system is equipped in the vehicle 100 including the sensor group 30 that measures the distance to the peripheral vehicle. When the control device 20 has detected the peripheral vehicle on which the driver sign 200*a* is displayed, the control device 20 executes the steering assist to operate the power steering system 50 such that the lateral distance to the peripheral vehicle on which the driver sign 200*a* is displayed is secured.

In the above safe-driving assist system, when the control device 20 has detected the peripheral vehicle on which the driver sign 200*a* is displayed, it is possible to easily know the lateral distance to the peripheral vehicle, based on the measurement result of the distance by the sensor group 30. Therefore, the control device 20 can unerringly secure the lateral distance to the peripheral vehicle, by executing the steering assist to operate the power steering system 50. Accordingly, the above safe-driving assist system can perform the driving assist such that the lateral distance is unerringly secured against the peripheral vehicle on which the driver sign 200*a* is displayed.

(5) When the control device 20 has detected the peripheral vehicle on which the driver sign 200*a* is not displayed, the control device 20 executes the general steering assist. The general steering assist is the steering assist to operate the power steering system 50 such that the lateral distance to the peripheral vehicle is equal to or longer than the first lateral distance LT1. On the other hand, when the control device 20 has detected the peripheral vehicle on which the driver sign 200*a* is displayed, the control device 20 executes the specified steering assist. The specified steering assist is the steering assist to operate the power steering system 50 such that the lateral distance to the peripheral vehicle is equal to or longer than the second lateral distance LT2 that is longer than the first lateral distance LT1.

In the above safe-driving assist system, against the peripheral vehicle on which the driver sign 200*a* is not displayed, the control device 20 executes the general steering assist to secure the lateral distance that is equal to or longer than the first lateral distance LT1. On the other hand, against the peripheral vehicle on which the driver sign 200*a* is displayed, the control device 20 executes the specified steering assist to secure the lateral distance that is equal to or longer than the second lateral distance LT2 that is longer than the first lateral distance LT1. Therefore, the control device 20 can selectively execute the general steering assist or the specified steering assist, depending on whether the driver sign 200*a* is displayed. In this way, it is possible to unerringly secure the lateral distance against the peripheral vehicle, by the steering assist to operate the power steering system 50, and in addition, to perform driving at ease, particularly against the peripheral vehicle on which the driver sign 200*a* is displayed.

MODIFICATION

The embodiment can be carried out while being modified as described below. The embodiment and the following modifications can be carried out while being combined with each other within a range in which there is no technical inconsistency.

- The vehicle 100 includes the sensor group 30 that acquires the relative distance to the peripheral vehicle. However, the safe-driving assist system in the embodiment can be applied to a vehicle that does not include the sensor group 30 that acquires the relative distance to the peripheral vehicle. For example, the safe-driving assist system only needs to be capable of recognizing the peripheral vehicle on which the driver sign 200*a* is displayed and calling the attention of the driver, and may be incapable of managing the motion of the vehicle 100. In this case, the control device 20 does not need to be connected to the power train 40, the power steering system 50, and the brake system 60. That is, the safe-driving assist system does not need to include the power train 40, the power steering system 50, and the brake system 60.
- The safe-driving assist system may be a system that performs only one of the speed control and the steering assist as the driving assist.
- The safe-driving assist system that performs the switching between the general driving assist and the specified driving assist depending on whether the peripheral vehicle on which the driver sign 200*a* is displayed has been detected has been exemplified. However, the safe-driving assist system may be a system that does not switch the manner of the driving assist.

What is claimed is:

1. A safe-driving assist system that is equipped in a vehicle including a drive recorder, the safe-driving assist system comprising:

a control device that executes acquiring an image captured by the drive recorder, detecting a peripheral vehicle shown in the acquired image, determining whether a driver sign is displayed on the detected peripheral vehicle, and outputting a warning signal when the peripheral vehicle on which the driver sign is displayed has been detected; and an informing device that informs a driver about existence of the peripheral vehicle on which the driver sign is displayed, when the warning signal output by the control device has been received, wherein:

the safe-driving assist system is equipped in the vehicle including a sensor group that measures a distance to the peripheral vehicle;

when the control device has detected the peripheral vehicle on which the driver sign is not displayed, the control device executes a general steering assist to operate a power steering system such that a lateral distance to the peripheral vehicle is equal to or longer than a first lateral distance; and when the control device has detected the peripheral vehicle on which the driver sign is displayed, the control device executes a specified steering assist to operate the power steering system such that the lateral distance to the peripheral vehicle is equal to or longer than a second lateral distance that is longer than the first lateral distance.

2. The safe-driving assist system according to claim 1, wherein:

when the control device has detected, as an ahead-traveling vehicle, the peripheral vehicle on which the driver sign is displayed, the control device executes a speed control to operate a power train and a brake system such that an inter-vehicle distance to the ahead-traveling vehicle is secured.

3. The safe-driving assist system according to claim 2, wherein:

when the control device has detected, as the ahead-traveling vehicle, the peripheral vehicle on which the driver sign is not displayed, the control device executes a general speed control to operate the power train and the brake system such that the inter-vehicle distance to the ahead-traveling vehicle is equal to or longer than a first inter-vehicle distance; and when the control device has detected, as the ahead-traveling vehicle, the peripheral vehicle on which the driver sign is displayed, the control device executes, as the speed control, a specified speed control to operate the power train and the brake system such that the inter-vehicle distance to the ahead-traveling vehicle is equal to or longer than a second inter-vehicle distance that is longer than the first inter-vehicle distance.

4. The safe-driving assist system according to claim 1, wherein the control device determines whether the driver sign is displayed on the detected peripheral vehicle by performing an image recognition process.

5. The safe-driving assist system according to claim 4, wherein the driver sign includes an elderly driver sign.

6. The safe-driving assist system according to claim 4, wherein the driver sign includes a beginner driver sign.

* * * * *